July 25, 1944.   G. T. DOWNEY   2,354,582
SELECTOR VALVE
Filed March 16, 1943    3 Sheets-Sheet 1
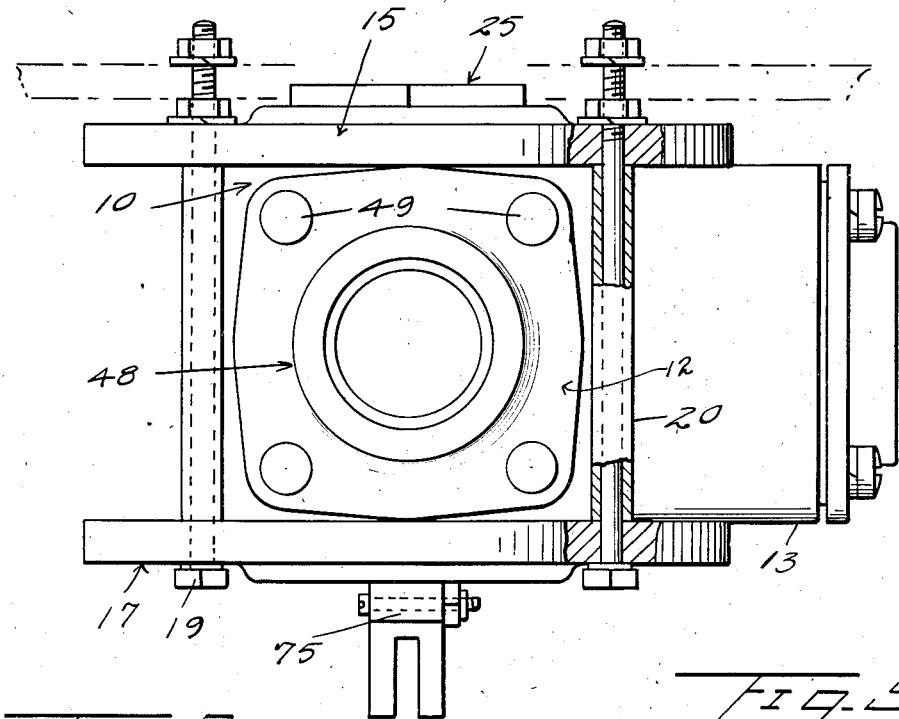
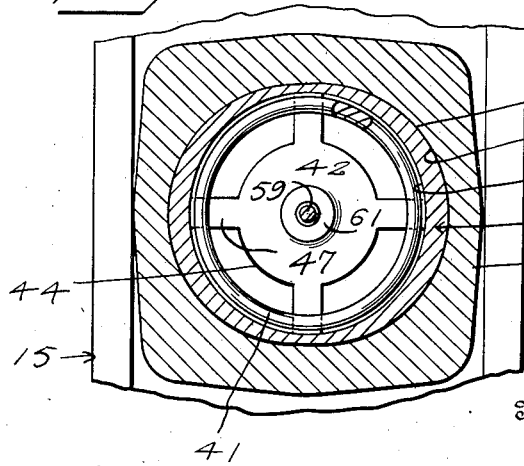
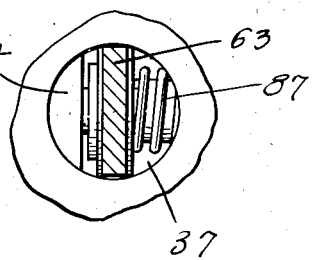
Inventor
G. T. Downey
By Kimmel & Crowell
Attorneys July 25, 1944.  G. T. DOWNEY  2,354,582
SELECTOR VALVE
Filed March 16, 1943  3 Sheets-Sheet 2
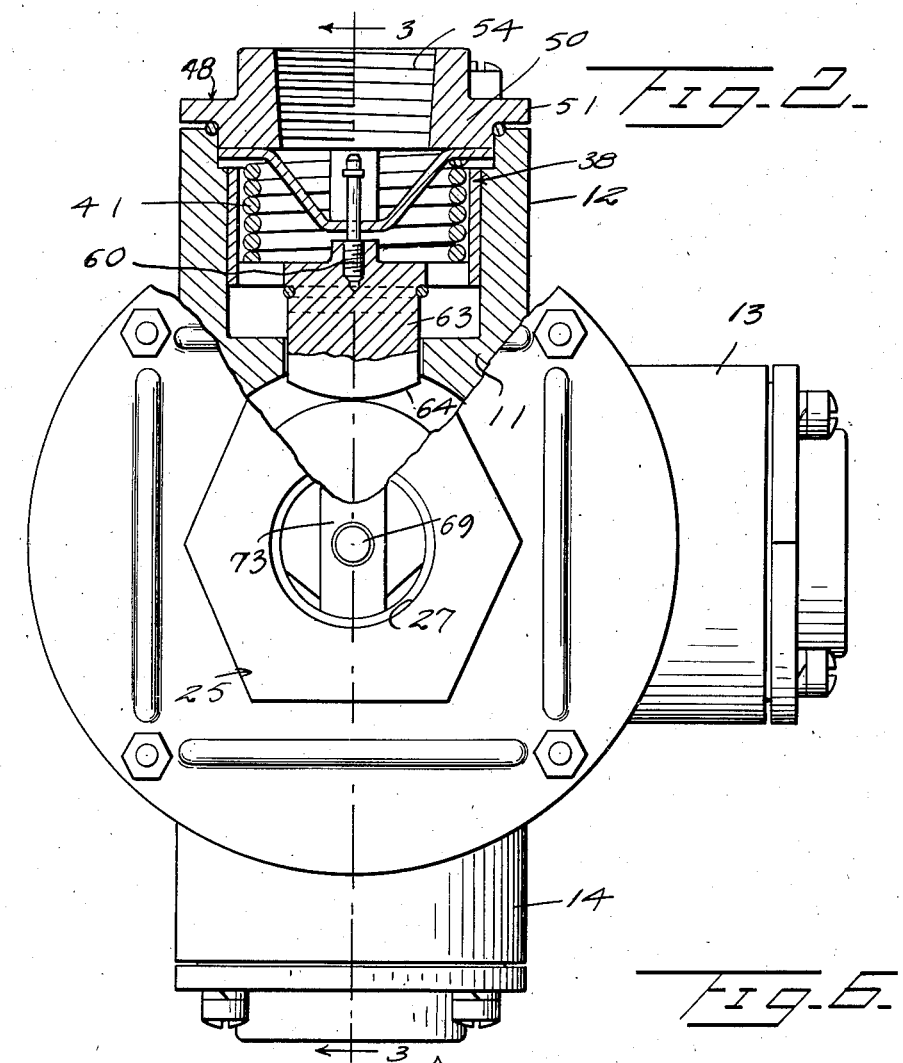
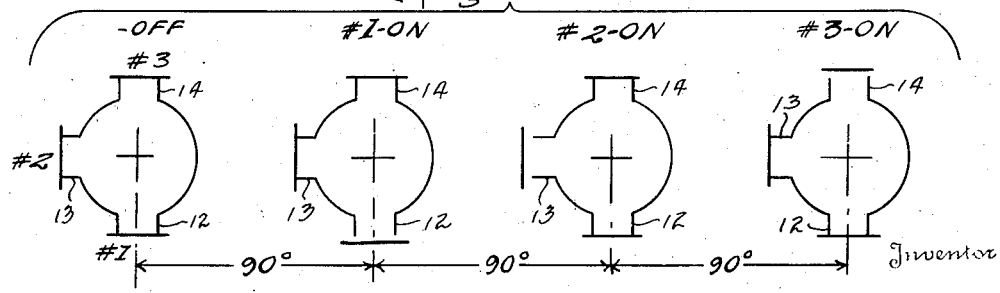
Inventor
G. T. Downey
By Kimmel & Crowell
Attorneys

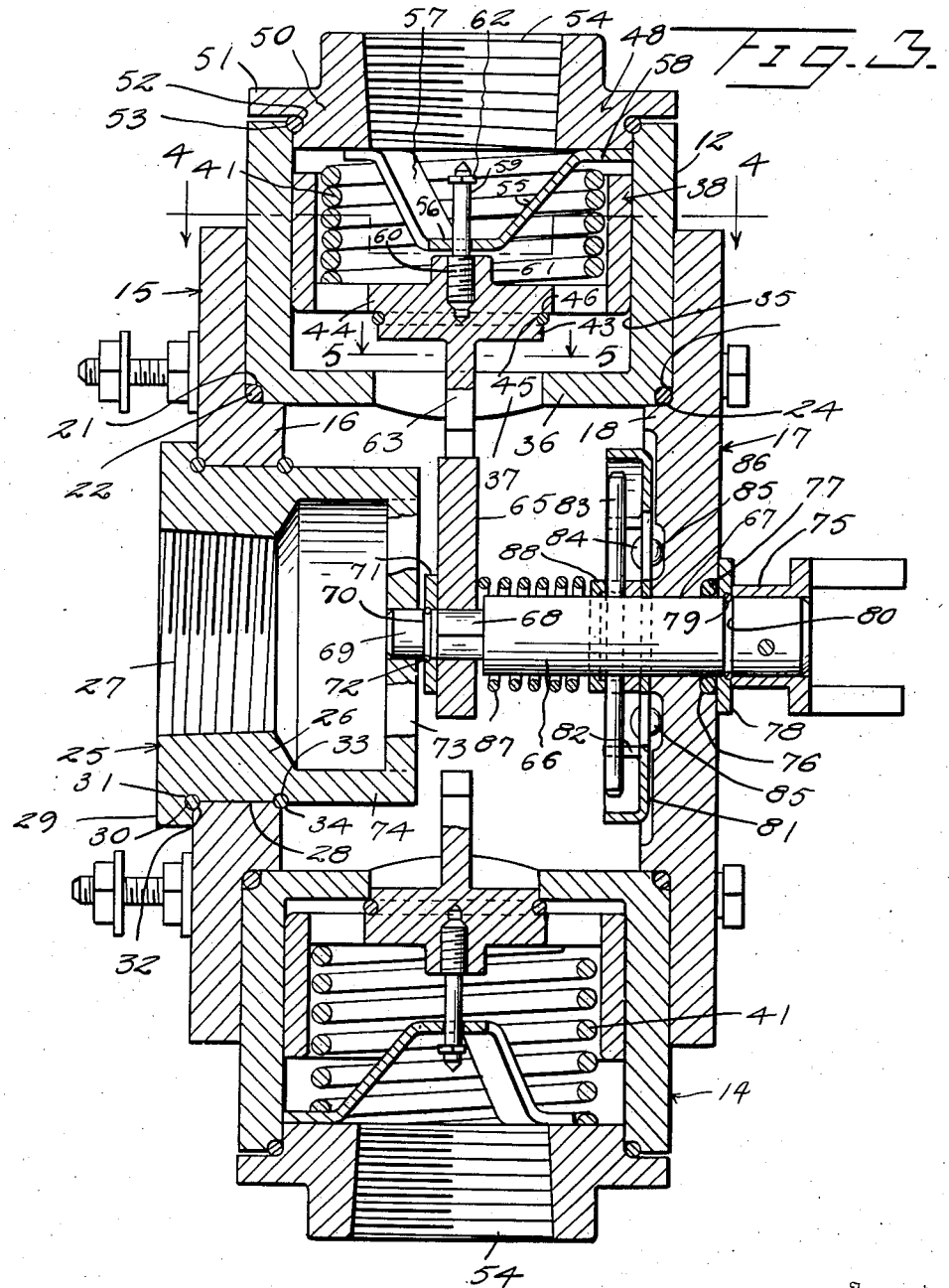

Patented July 25, 1944

2,354,582

UNITED STATES PATENT OFFICE 2,354,582

SELECTOR VALVE

George T. Downey, Corry, Pa., assignor to Aero Supply Mfg. Co. Inc., Corry, Pa.

Application March 16, 1943, Serial No. 479,379

9 Claims. (Cl. 251—132)

This invention relates to a valve assembly.

An object of this invention is to provide a valve assembly including a valve housing having a plurality of intake ports and a common outlet port, the intake ports being provided with spring-pressed valves, and the housing being provided with a valve operator for moving a selected one of the several valves in open position.

Another object of this invention is to provide a valve assembly wherein the housing may be formed out of plastic material so that a minimum amount of metal will be necessary.

A further object of this invention is to provide in an assembly of this kind removable valve cages which are so constructed and arranged as to facilitate the repair or replacement of the valve parts without taking the entire assembly apart.

A further object of this invention is to provide an improved valve member and a seal element for engagement with the valve seat formed with the housing, the valve member being formed as part of the valve cage and the housing and cage being so formed as to hold the cage against rotation while permitting sliding movement of the cage.

To the foregoing objects and to others which may hereinafter appear, the invention consists of the novel construction, combination and arrangement of parts as will be more specifically refered to and illustrated in the accompanying drawings wherein are shown embodiments of the invention, but it is to be understood that changes, variations and modifications may be resorted to which fall within the scope of the invention as claimed.

Figure 1 is a plan view partly broken away and in section of a valve assembly constructed according to an embodiment of this invention.

Figure 2 is a detail rear elevation partly in section of the assembly.

Figure 3 is a sectional view taken on the line 3—3 of Figure 2.

Figure 4 is a fragmentary sectional view taken on the line 4—4 of Figure 3.

Figure 5 is a fragmentary sectional view taken on the line 5—5 of Figure 3.

Figure 6 is a diagrammatic view showing the several positions of the valves in this assembly.

Referring to the drawings the numeral 10 designates generally a housing which is formed of a cylindrical body 11 having formed integral therewith a plurality of radially arranged cylindrical valve housings 12, 13 and 14. A rear head or plate 15 is secured to the rear of the body 11 and is formed with a reduced diameter extension 16 engaging interiorly of the body 11. A front head or plate 17 is disposed at the front end of the body 11 and is formed with a reduced diameter extension 18 extending interiorly of the body 11.

A plurality of fastening members 19 are extended through the two heads 15 and 17 on the outside of the body 11, and preferably cylindrical spacer sleeves 20 are disposed about the fastening members 19 between the two heads 15 and 17 as shown in Figure 1.

The boy 11 at the rear end thereof is formed with an annular groove 21 within which a ring-shaped sealing member 22 is adapted to engage. The head 15 is adapted to bear against the sealing member 22 so that tightening of the fastening members 19 will seal the head 15 at the rear of the body 11. The body 11 at the forward end thereof is provided with an annular groove or channel 23 within which a ring-shaped sealing member 24 is adapted to engage, so that the forward head 17 will be sealed relative to the body 11 upon tightening of the fastening members 19.

The valve housings 12, 13, and 14 constitute intake housings for connection to a source of fluid supply, and the fluid entering the body 11 through a selected one of the valve housings is adapted to be discharged from the body 11 through an outlet member generally designated as 25. The outlet member 25 comprises a cylindrical body 26 having a threaded bore 27 therethrough, and the body 26 snugly engages in a central opening 28 formed in the body 15. The body 26 is formed at its outer end with a flange 29 adapted to bear against the outer side of the head 15, and a sealing ring 30 is adapted to engage in confronting grooves 31 and 32 carried by the body 26 and the head 15 respectively. The body 26 is also formed with an inner groove 33 within which a split locking ring 34 is adapted to releasably engage. The locking ring 34 is adapted to bear against the inner portion of the head 15 and to maintain the sealing member 30 under compression so as to provide a liquid-tight joint between the coupling member 25 and the head 15.

The valve housings 12, 13 and 14 have mounted therein valve structures which are of identical constructions and the detailed description of the valve structure in one housing will apply equally as well to the valve structures in the other housings. The valve housing 12 is formed with an oblong or substantially elliptical inner surface 35, and is also provided with an inner wall or valve seat 36 having a central opening 37 for communicating the interior of the housing 12 with the interior of the body 11. A valve cage generally designated as 38 is slidably mounted within the housing 12 and, as shown in Figure 4, is formed with an elliptical or oblong outer surface 39 slidably engaging the rear of the housing 12. The provision of the elliptical or oblong cage 38 provides a means whereby the cage 38 will be held against rotation relative to the housing 12 but will be permitted endwise sliding movement. The cage 38 is formed with a cylindrical inner surface 40 within which a spring 41 is mounted. The cage 38 at its inner end is provided with a valve member generally designated as 42. The valve member 42 comprises a valve body 43 which has a diameter such as to permit the body 43 to slidingly engage in the opening 37. A flange 44 is formed integral with the body 43 and is adapted to engage the outer side of the seat or wall 36 when the valve member 42 is in a sealing position. The body 43 is provided with an annular groove 45, and a ring-shaped gasket or sealing member 46 is mounted in the groove 45 and is adapted to contact with the edge of the opening 37 when the cage 38 is in a port closing position under the action of the spring 41. The valve member 42 has an outer diameter less than the inner diameter of the cage 38 and is secured to the inner end of the cage 38 by means of integral supporting radial arms 47.

A coupling member 48 is secured to the outer end of the valve housing 12 by fastening members 49, and includes a coupling body 50 formed with an outer flange 51. The body 50 is formed with an annular groove 52 within which a resilient sealing ring 53 is adapted to engage. The body 50 is provided with an internally threaded bore or port 54 so that the coupling member 48 may be connected to one end of a fluid supply pipe. A spider 55 is disposed within the cage 38, and includes a central body 56 having a plurality of radially arranged and outwardly inclined arms 57 formed integral therewith. The arms 57 also have formed integral therewith obtusely disposed outer arms 58 against which the outer end of the spring 41 is adapted to engage. The provision of the inward offsetting of the central body 56 of the spider 55 provides a limiting means for limiting the outward movement of the cage 38. The valve member 42 in the center thereof has secured thereto a valve guiding stem 59 which at its inner end is threaded as at 60 into a boss 61 formed on the outer side of the valve member 42. A split ring or retainer 62 is mounted on the stem 59 adjacent the outer end thereof so as to hold the cage assembly, including the cage member 38, the spring 41 and the spider 55, in assembled position before the coupling member 48 is secured to the housing 12.

The valve member 42 has formed integral with the inner end thereof a cam engaging lug 63. The lug 63, as shown in Figure 2, is formed with a convex inner end 64 which is adapted to engage a cam 65. The cam 65 is mounted on a cam shaft 66 which is journalled through an opening 67 formed in the head 17. The cam shaft 66 is provided with a reduced polygonal stud 68, and the cam shaft 66 is also formed with a round stud 69 extending inwardly from the polygonal stud 68, and an annular groove 70 is formed in the reduced stud 69. A washer or clamping plate 71 is mounted on the reduced stud 69, and is held in clamping position against the inner face of the cam 65 by means of a split removable locking ring 72 which engages in the annular groove 70. The inner end 69 of the cam shaft 66 is journalled in a bearing 73 which is secured to or formed integral with a pair of inwardly projecting arms 74 carried by or formed integral with the outlet body 26.

The cam shaft 66 has secured to the outer end thereof a coupling yoke 75 which is adapted to have secured thereto an operating handle whereby the shaft 66 may be manually rotated to effect engagement of the cam 65 with a selected lug 63. The head 17 in the outer side thereof is formed with an annular channel or groove 76, and a ring-shaped sealing member 77 is seated in the groove 76 and engages about the shaft 66. A seal compressing washer or plate 78 is mounted on the shaft 66 between the yoke 75 and the outer side of the head 17 and is adapted to bear against the sealing member 77. The washer or seal compressing member 78 is held against movement endwise of the shaft 66 by means of a split locking ring 79 engaging in an annular groove 80 formed in the cam shaft 66.

The cam shaft 66 is adapted to be held in a selected position by means of an index plate 81 which is mounted on the shaft 66 within the housing 10. The plate 81 is held against rotation relative to the shaft 66 by means of opposing pairs of fingers 82 which are struck inwardly from the plate 81 and engage on opposite sides of a plate locking pin 83 which is extended diametrically through the shaft 66. The plate 81 is formed with a plurality of inwardly offset detents 84 within which balls 85 are adapted to partly engage. The balls 85 also engage in elongated inwardly opening recesses 86 which are formed in the inner side of the head 17. The plate 81 is constantly urged outwardly by means of a spring 87 mounted on the shaft 86 and bearing at its inner end against the cam member 65. The outer end of the spring 87 bears against a U-shaped member 88 which straddles the pin 63 and has the parallel legs thereof bearing against the inner side of the plate 81.

In the use and operation of this valve assembly, the cam shaft 66 may be rotated to engage a selected lug 63 for opening the desired valve structure. When the lug 63 is engaged by the cam 65 the valve member 43 will be moved outwardly off of the seat 36 and the spring 41 will be placed under compression. The stem 59 will slidingly move outwardly through the center portion 56 of the spider 55. The fluid may then flow from the interior of the valve housing 12 into the body 11 and then between the arms 74 and out through outlet port 27.

The valve assembly hereinbefore described may be constructed in great part out of plastic material, and this material may include the construction of the housing 10 including the body 11, the valve housings 12, 13 and 14 and the heads 15 and 17. The remaining portions of the valve assembly may be made out of metal or other suitable material. This valve assembly is designed for use with airplanes for regulating the flow of gasoline from remote supply tanks to one or more engines. The valve assembly is so constructed that it may be readily taken apart for repair and any leakage in the valve members may be overcome by inserting new resilient valve gaskets 46. This feature eliminates the necessity of regrinding the valve members and valve seats.

What is claimed is:

1. A valve assembly comprising a housing formed of a cylindrical body, a radially arranged cylindrical valve housing extending from said body, front and rear heads for said body, said rear head having an outlet port, means securing said heads to said body, said valve housing being formed with a substantially oval-shaped inner side, a valve cage slidable in said housing and formed with an oval-shaped outer side and a cylindrical inner side, a valve seat carried by the inner end of said housing having a port therethrough, a disc-shaped valve member, radial arms integral with said valve member and said cage, said valve member loosely engageable in said port and having an annular groove, a flange carried by said valve member for engagement with the outer side of said seat to limit the inward movement of said valve member, a spring constantly urging said valve member inwardly, a cam engaging lug carried by said valve member and projecting through said port into said first body, a cam shaft rotatably carried by said heads, and a cam fixed on said cam shaft, rotation of said shaft effecting movement of said cage and valve member to open position.

2. A valve assembly comprising a housing formed of a hollow body having an outlet port, a valve housing extending from said body, said valve housing having a substantially oval-shaped inner side and an inner outlet port, an oval-shaped valve cage slidable in said valve housing, a valve member carried by the inner end of said cage slidably engageable in said inlet port, the outer side of said inlet port constituting a valve seat, said valve member having an annular groove therein, an annular resilient sealing member seated in said groove, a spring constantly urging said cage and valve member inwardly to port closing position, a cam engaging lug fixed to said valve member and extending inwardly of said body through said inlet port, and rotatable cam means carried by said first housing engageable with said lug for moving said valve member outwardly to open position.

3. A valve cage assembly comprising a tubular cage, a valve member at the inner end of said cage, means supporting said valve member concentrically of said cage, a lug fixed to said valve member and extending therefrom, a spring within said cage, a spider formed with a central inwardly offset part and spring retaining arms engaging the outer end of said spring, a centrally disposed stem carried by said valve member and loosely engaging through the central offset of said spider, and a split ring engaging about the outer portion of said stem.

4. A valve cage assembly comprising a tubular cage, a valve member at the inner end of said cage, said member having an annular groove, a sealing ring seated in said groove and projecting laterally from said member, a spring in said cage, a spring retaining spider engaging the outer end of said spring and having a central opening, an outwardly extending stem fixed to said member and loosely engaging through said opening in said spider, and a split ring about the outer portion of said stem.

5. A valve structure comprising a housing having an outlet port and an intake housing, and a cage assembly in said intake housing, said cage assembly comprising a tubular cage, said cage and intake housing being so constructed and arranged that said cage will be held against rotary movement, a valve member at the inner end of said cage, said member having an annular groove, a sealing ring seated in said groove and projecting laterally from said member, a spring in said cage, a spring retaining spider engaging the outer end of said spring and having a central opening, an outwardly extending stem fixed to said member and loosely engaging through said opening in said spider, and a split ring about the outer portion of said stem.

6. A valve structure comprising a housing having an outlet port and an intake housing, a cage assembly in said intake housing, said cage assembly comprising a tubular cage, a valve member at the intake end of said cage, means supporting said valve member concentrically of said cage, a lug fixed to said valve member and extending therefrom, a spring within said cage, a spider formed with a central inwardly offset part and spring retaining arms engaging the outer end of said spring, a centrally disposed stem carried by said valve member and loosely engaging through the central offset of said spider, a split ring engaging about the outer portion of said stem, a coupling member secured to the outer end of said intake housing bearing against said spider to thereby hold said spring under tension and constantly urge said valve member to closed position, and rotatable cam means in said first housing for holding said valve member in open position.

7. In a valve structure including a housing formed with intake housing and an outlet port, a wall at the inner end of said intake housing having an opening communicating with the interior of the housing, a valve assembly slidable in said intake housing, said assembly including a tubular cage, a valve member fixedly carried by the inner end of said cage adapted, when in closed position, to engage within said opening, and spring means constantly urging said valve member to closed position, said cage and said intake housing being so arranged and constructed as to hold said cage against rotary movement.

8. In a valve structure including a housing formed with intake housing and an outlet port, a wall at the inner end of said intake housing having an opening communicating with the interior of the housing, a valve assembly slidable in said intake housing, said assembly including a tubular cage, a valve member fixedly carried by the inner end of said cage adapted, when in closed position, to engage within said opening, and spring means constantly urging said valve member to closed position, said intake housing and said cage having an oval configuration whereby said cage will be held against rotary movement.

9. In a valve structure including a housing formed with intake housing and an outlet port, a wall at the inner end of said intake housing having an opening communicating with the interior of the housing, a valve assembly slidable in said intake housing, said assembly including a tubular cage, a valve member fixedly carried by the inner end of said cage adapted, when in closed position, to engage within said opening, a ring-shaped sealing member carried by said valve member, and spring means constantly urging said valve member to closed position, said cage and said intake housing being so arranged and constructed as to hold said cage against rotary movement.

GEORGE T. DOWNEY.